United States Patent [19]

Tomososki

[11] Patent Number: 5,038,983
[45] Date of Patent: Aug. 13, 1991

[54] VEHICLE CARGO CARRIER ATTACHMENT

[75] Inventor: Louis H. Tomososki, Clarkamas, Oreg.

[73] Assignee: Carefree/Scott Fetzer Company, Broomfield, Colo.

[21] Appl. No.: 248,645

[22] Filed: Sep. 26, 1988

[51] Int. Cl.⁵ .................................................. B60R 9/06
[52] U.S. Cl. ............................... 224/42.43; 224/42.07; 280/769; 414/462
[58] Field of Search ............... 224/42.43, 42.03, 42.06, 224/42.07, 42.08, 42.13, 273, 281, 324, 329, 330, 42.44, 42.45 R; 211/23; 280/769, 186; 414/462; 403/292, 306, 300, 378

[56] References Cited

U.S. PATENT DOCUMENTS

| D. 294,564 | 3/1988 | Stoecker | D12/158 |
|---|---|---|---|
| 1,606,954 | 11/1926 | Moen et al. | 224/42.13 |
| 1,849,046 | 3/1932 | Arndt | 224/42.43 |
| 1,913,256 | 6/1933 | Widener | 224/42.13 |
| 2,541,244 | 2/1951 | Hack | 224/42.43 |
| 3,103,290 | 9/1963 | Perri | 214/450 |
| 3,202,332 | 8/1965 | Walker | 224/42.08 |
| 3,334,761 | 8/1967 | Perri | 214/450 |
| 3,650,443 | 3/1972 | Haskett et al. | 224/42.03 A |
| 3,724,694 | 4/1973 | Wilson | 214/450 |
| 3,796,333 | 3/1974 | Goldstein | 224/42.44 |
| 4,394,947 | 7/1983 | Tartaglia | 224/42.43 |
| 4,461,410 | 7/1984 | Tartaglia | 224/42.03 |
| 4,635,835 | 1/1987 | Cole | 224/42.03 B |
| 4,771,926 | 9/1988 | Anderson et al. | 224/42.08 |
| 4,813,584 | 3/1989 | Wiley | 224/42.44 |
| 4,915,276 | 4/1990 | Devito | 224/42.45 R X |
| 4,938,399 | 7/1990 | Hull et al. | 224/42.43 |

OTHER PUBLICATIONS

Kessler Sale Corporation, *Trailer Hitch Attached Luggage Carrier* advertisement, (5 pp.—undated).
*Peterson Hunting Magazine* advertisement and article: re Game Carrier, dated Oct., 1987.

Primary Examiner—Henry J. Recla
Assistant Examiner—Glenn T. Barrett
Attorney, Agent, or Firm—Gary M. Polumbus

[57] ABSTRACT

A cargo carrier for use on the outside of a vehicle having a trailer hitch receiver includes a tub, a rigid bracket for supporting the tub, and a pair of tail lights on the rear of the tub. The bracket is adapted at the lower end for insertion into the receiver for supporting the carrier without attachment to the bumper or frame of the vehicle. At the upper end, a rigid, flat plate is connected to the bracket for supporting and stabilizing the tub. The bracket is shaped to position the container elevated above the height of the receiver and spaced rearwardly apart from the vehicle to accommodate a spare tire.

6 Claims, 2 Drawing Sheets

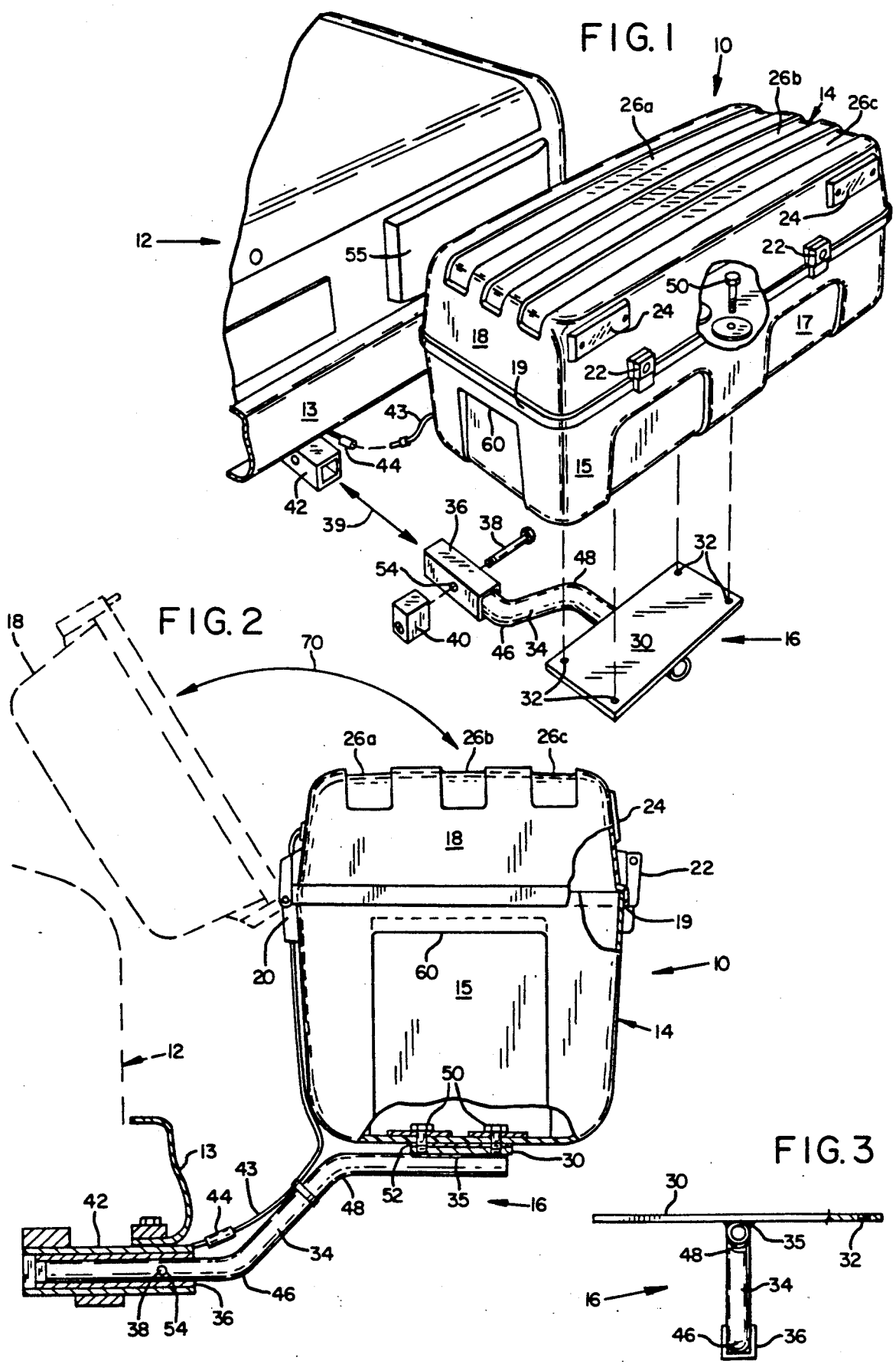

VEHICLE CARGO CARRIER ATTACHMENT

BACKGROUND OF THE INVENTION

This invention relates to a vehicle cargo carrier attachment and, more particularly, to an attachment adapted to connect to a receiver-type trailer hitch.

The proliferation in recent years of compact automobiles has reduced the available cargo space within such automobiles. Four passengers in a modern compact automobile leave very little room for cargo and personal belongings. Trunk space is limited as well. It is often desirable, however, particularly for hunting, camping and other outdoor recreational activities, to transport sleeping bags, tents, water jugs and various other bulky items in a vehicle.

A variety of devices are known for fastening to the exterior of an automobile to carry luggage and other items. For example, luggage racks are known which are positioned on top of the automobile. Racks of that type are burdensome to install as they typically are fastened to the vehicle in four places. They are hard to reach from the ground and therefore difficult to load and unload.

Other devices are known which attach to the rear bumper of the automobile. It has been found, however, that automobile bumpers typically are structurally inadequate to support substantial loads. Accordingly, most devices intended for attachment to the automobile bumper also include brackets for attachment to the frame of the automobile. Examples of devices of this type are shown in U.S. Pat. Nos. 3,334,761 and 3,103,290. These devices are very difficult to install and remove because of the need to crawl under the vehicle to clamp the devices onto the frame.

Another load carrying attachment designed for mounting on the rear of a motor vehicle is shown in U.S. Pat. No. 3,724,694. That device is attached in a cantilevered fashion, supported at one point by a standard trailer hitch ball, and at other points on the frame underneath the vehicle. Additionally, it is attached to the automobile bumper. All of this complexity makes it time-consuming and difficult to install and remove from a vehicle. Similarly, U.S. Pat. No. 3,650,443 shows an animal carrier which clamps onto an automobile bumper at two locations and onto a ball-type trailer hitch at a third location.

Other load-carrying devices for use with automobiles are known which are adapted for bolting on to the tongue of a standard ball-type automobile trailer hitch. To use such devices, the ball is first removed from the hitch. An apparatus of that type is shown in U.S. Pat. No. 4,394,947. A subsequent patent issued to the same inventor, U.S. Pat. No. 4,461,410, shows a similar apparatus that is adapted for carrying a bicycle. Another vehicle trailer hitch mounted bicycle carrier is shown in U.S. Design Pat. No. 294,564. These devices are not suitable for containing a plurality of articles or for bearing large loads.

Contemporary automobile design favors bumpers that are integrated into the exterior shape of the automobile for aesthetic and perhaps aerodynamic reasons. Generally, little or no access is provided to get around the edges to the inside of the bumper. Thus, cargo carriers that require clamping around the rear bumper cannot be used on many modern vehicles.

Another popular trend, particularly for outdoor recreational uses such as hunting and snow skiing, is the use of motor vehicles which are a hybrid of a conventional passenger vehicle or station wagon and a panel truck. These types of vehicles often are referred to by their trade names such as Bronco or Blazer. Frequently, a spare tire is mounted on the rear end of the vehicle which interferes with the use of bumper-mounted carriers, such as those described above.

Accordingly, the need remains for a cargo carrier attachment for use with a vehicle which can be quickly and easily attached to and detached from the vehicle, preferably without the need for tools.

SUMMARY OF THE INVENTION

One object of the invention is to improve upon auxiliary cargo accessories for motor vehicles. Another object is to provide a cargo carrier that does not require attachment to the bumper or the frame on the underside of the vehicle, yet can carry substantial loads safely. A further object is to enable a single configuration of cargo carrier to be used with a variety of vehicle body and bumper designs. Yet another object is to provide for conveniently carrying cargo at the rear of a vehicle having a spare tire mounted thereon.

The present invention includes methods and a cargo carrier apparatus for carrying cargo on the exterior of a vehicle having a hollow trailer hitch receiver. The cargo carrier includes a container for holding a predetermined volume of cargo. Preferably, the container is a waterproof tub having a hinged lid for opening and closing the tub and at least one latch for securing the lid in a closed position. The tub and the lid are formed of an impact-resistant synthetic material or an impact-resistant polymeric material.

A rigid bracket having first and second end portions is provided for supporting the container in a predetermined position relative to the automobile. The bracket is adapted at the first end portion for insertion into the receiver and adapted at the second end portion for removable connection to the container. Specifically, the bracket includes a rigid plate welded to the second end portion for supporting the container. The container is bolted to the plate. Retainer means serve to retain the first end portion of the bracket substantially completely engaged into the hitch receiver.

The bracket preferably is formed of metal so as to include a pair of complementary obtuse bends such that the first and second end portions are parallel to and offset from each other so that, when the carrier is mounted on the vehicle, the container is positioned elevated above the height of the receiver. Additionally, the container is positioned spaced rearwardly apart from the vehicle a distance sufficient to clear a spare tire mounted between the rear of the vehicle and the container. The tub and the bracket are sized and shaped such that the bracket fits into the tub for storage when then carrier is not in use.

In the preferred embodiment, the bracket includes a sleeve formed of square steel tubing, fixed in position covering the first end portion of the bracket means to form a square external cross-section, the square steel tubing being sized and having a length to coincide with the interior configuration of the receiver to prevent relative motion between the bracket and the receiver when the bracket is mounted in the receiver. The hitch receiver includes an aligned pair of apertures positioned on opposite sides of the receiver, and the bracket includes means defining a transverse channel through the first end portion of the bracket, positioned to register with the apertures in the receiver upon engagement of the bracket within the receiver so that, upon engagement of the bracket means within the receiver, the apertures and the channel in combination define a passageway through the receiver and the bracket for receiving a rigid pin to maintain the bracket so engaged. A locking means may be included for preventing removal of the pin to prevent accidental or unauthorized removal of the carrier from the vehicle.

A pair of electric tail lights are positioned at the ends of the lid, oriented to be visible from the rear of the vehicle and adapted for removable electrical connection to the vehicle tail light system. When the carrier is mounted to the vehicle, the container is positioned raised above the height of the receiver to enhance visibility of the tail lights.

The foregoing and other objects, features and advantages of the invention will become more readily apparent from the following detailed description of a preferred embodiment which proceeds with reference to the drawings.

BRIEF DESCRIPTION OF THE DRAWINGS

FIG. 1 is an exploded perspective view of a cargo carrier attachment according to the present invention, shown generally in position for mounting at the rear of a vehicle.

FIG. 2 is a side elevational view of the cargo carrier of FIG. 1 mounted in a hitch receiver on the motor vehicle, shown in cross section, the cargo box shown broken away in several places to reveal additional detail.

FIG. 3 is an enlarged rear elevational view of the mounting plate and the member to which the mounting plate is connected.

DETAILED DESCRIPTION OF A PREFERRED EMBODIMENT

Figure 4:
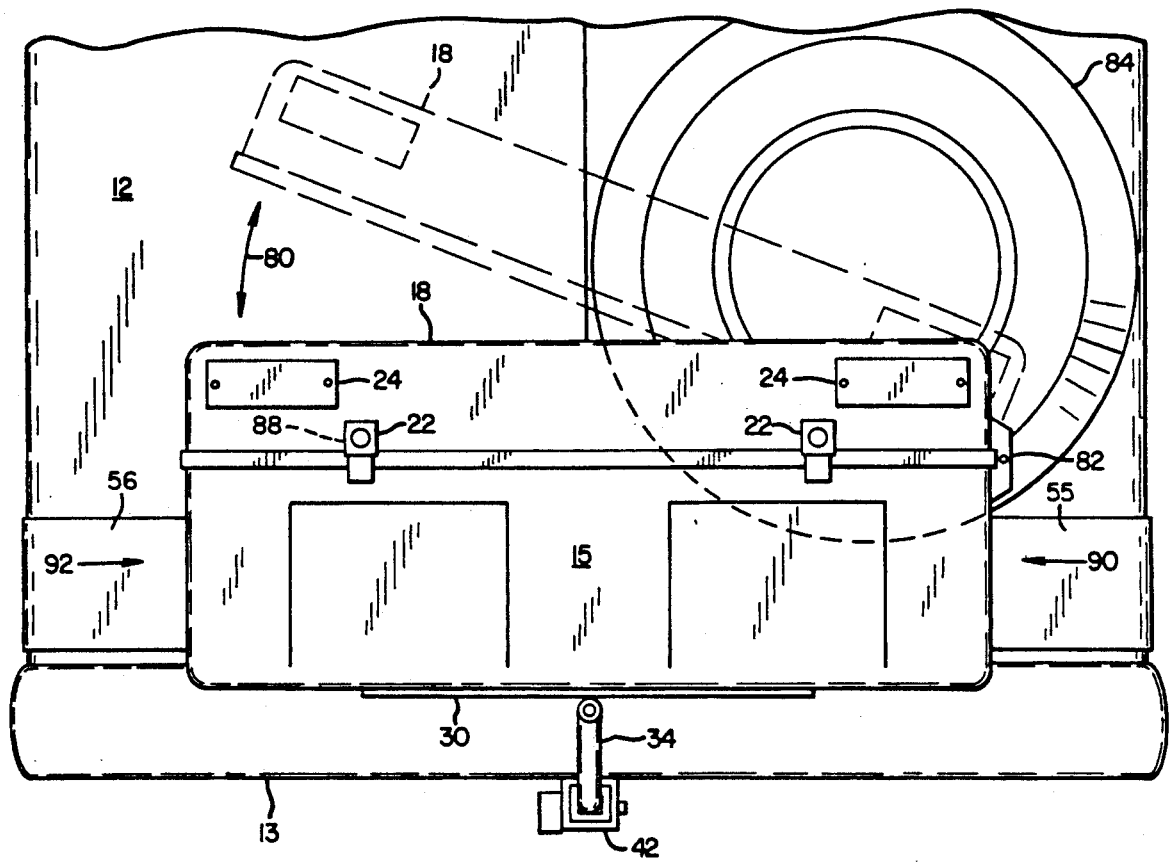
FIG. 4 is a rear elevational view of an alternative embodiment of the cargo carrier of FIG. 1 mounted on a motor vehicle having a spare tire mounted to the rear of the vehicle.

Referring to FIGS. 1 and 2, a cargo carrier attachment 10 is shown positioned behind a vehicle 12. The cargo carrier attachment 10 generally comprises a cargo box 14 and a bracket assembly 16 for supporting the cargo box and mounting it to the vehicle 12 such that the cargo box 14 remains in a fixed position relative to the vehicle 12. The cargo box 14 includes a tub 15 for holding articles of cargo and a lid 18 for closing the tub 15. The cargo box 14 is removably connected to the bracket assembly 16. The bracket assembly is adapted at a first, lower end to slide into a hitch receiver 42 fixed below the vehicle bumper 13, as further described below.

The cargo box 14 is molded of a sturdy polymeric or fiberglass material, preferably ABS-type plastic. Similarly, the tub 15 may include recesses or cutaways 17 to strengthen it. A recess 60 is formed in each end of the tub to facilitate hand-carrying the container when it is not connected to the vehicle.

The lid 18 preferably includes a lip 19 sized to extend over the top edge of the tub 15 to prevent dirt, rain water, etc. from leaking into the tub. A gasket is adhered to the lid along the interior of lip 19 for better sealing the cargo box 14 against the elements. The gasket may be formed, for example, of neoprene rubber. The lid 18 is formed to include a plurality of channels 26a–26c to enhance its strength and rigidity.

The lid 18 is connected to the tub 15 along the front edge by at least one hinge, such as by hinges 20, one of which is shown in FIG. 2. The "front" of the carrier attachment refers to the direction toward the front of the vehicle to which the carrier is to be connected. Preferably, hinge 20 is an adjustable friction hinge, such as that shown in U.S. Pat. 4,630,333, which may be adjusted to hold the lid up for loading and unloading the tub 15. These hinges are commercially available from Southco, Inc. in Corcordville, Pa. The lid swings open toward the vehicle as indicated by arrow 70.

The lid 18 is secured to the tub 15 in the closed position by at least one latch 22. Preferably, the latches are key-lockable for security. When the cargo carrier is not in use, it may be stored, for example, in the owner's garage, where it provides a handsome, lockable storage unit.

Figure 5:
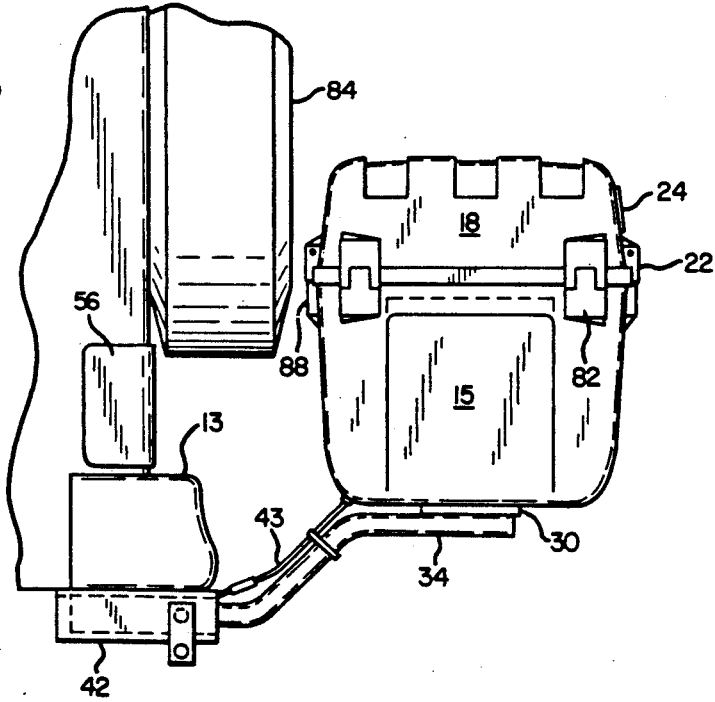
FIG. 5 is a side elevational view of the cargo carrier of FIG. 4 showing the positioning of the cargo carrier relative to the spare tire.

Referring to FIGS. 4 and 5, an alternative embodiment is shown which is preferred for use on vehicles having a spare tire 84 mounted on the back of the vehicle. This embodiment is similar to that shown in FIGS. 1–3, with the following exceptions. Referring to FIG. 4, a pair of hinges 82 are provided on the right end 90 of the container so that the lid 18 may be opened alongside tire 84 as indicated by arrow 80 toward the position shown in phantom and beyond. The lid 18 thus opens alongside the spare tire 84, rather than toward the vehicle. Tail light wiring 43 (further described below) is routed through the hinged end of lid 18. In this way, spare tire 84 does not interfere with opening and closing the lid 18. A pair of latches 22 are provided as in the first embodiment. An additional latch 88 is provided on the front side of the container, positioned near the left end 92 of the container. In this position, the latch 88 is easily accessible by an operator standing adjacent the left end 92 of the container and latch 88 may be operated without interfering with spare tire 84.

In both embodiments, lid 18 further includes a pair of laterally-spaced electric lights 24 for use at night or when weather conditions impair visibility. These may include turn indicator lights and tail (running) lights, as well as brake lights. The cargo carrier is sized so that it does not obscure most vehicles' tail lights. Thus, the cargo carrier lights 24 supplement rather than replace the vehicle tail lights 55, 56 though they may be adapted to serve as the vehicle tail lights in applications where that is required. The lights 24 are connected to the vehicle's electrical system via cable 43 and detachable connector 44 (FIG. 2), both of which are known and commonly used with conventional trailers. Cable 43 enters the wall of lid 18 at a central position in the wall between hinges 20 and is secured therein by a grommet. The cable extends rearward beneath the top of the lid to each of lights 24.

The cargo box 14 is removably mounted onto the bracket assembly 16 by four bolts 50 as further described below. The bolts pass through apertures provided in the bottom of the tub for that purpose. It may be convenient to carry a tool in the tub for removing the tub from the bracket assembly and replacing it at any time.

The bracket assembly 16 comprises generally a rigid elongate member 34, a square sleeve 36 positioned over a first end of member 34, and a plate 30 connected to the second end of member 34. The member 34 is formed of round steel stock, sized as appropriate in relation to the hitch receiver 42 as further explained below. The member 34 is formed to include two bends 46 and 48, having equal and opposite obtuse angles (e.g. 135°), so that the end portions of the member 34 are parallel to one another, with the rear end portion spaced above the first or front end portion as best seen in the side elevation in FIG. 2.

The sleeve 36 is positioned over the first end portion of the member, extending axially a short distance (e.g. 1 inch) beyond the first end. It is fixed there, for example, by welding. The sleeve 36 has a square exterior cross section, sized to slide into the receiver 42, as indicated by arrow 39, and fit snugly therein with just enough clearance or play to permit removal. The interior configuration of the sleeve 36 is also square in cross-section, sized to receive the round first end of member 34, substantially without play. Thus, where the sleeve is positioned in the receiver, the member is substantially fixed in position so as to prevent lateral or rotational displacement relative to the vehicle.

The first end of the member has a transversely-aligned pair of holes 54 through the member and sleeve 36 for receiving a pin 38. The pin 38 passes through corresponding holes in the receiver, as it is known in the trailer field, for retaining the member engaged within the receiver. Preferably, a locking mechanism 40 (FIG. 1) is provided that connects to the end of the pin 38 to prevent unauthorized removal of the cargo carrier from the vehicle. Such locking devices are commercially available.

Referring to FIGS. 2 and 3, plate 30 is a rigid, flat, rectangular plate fixed to the second or upper end of the member 34. The plate 30 is positioned such that the face of the plate is parallel to (and spaced above) the top of sleeve 36. The plate 30 is sized to provide vertical support and lateral stability to the container. The plate 30 is welded securely to member 34 by a pair of weld beads 35 (FIG. 3), each bead extending along substantially the full width of the plate. Holes 32 ar provided through the plate 30 to receive the bolts 50 for removably fastening the tub 15 to the plate. Lock washers and nuts may be applied to retain the bolts or, preferably, threads are tapped in the holes 32 in the plate. The latter method facilitates mounting and dismounting the cargo box by one person and inhibits unauthorized removal of the cargo box from the plate. A gasket 52 may be used between the plate and the tub.

For many applications, the cargo box is simply left connected to the bracket assembly. To connect the cargo box to the vehicle, the user simply aligns the cargo carrier behind the vehicle, slides the first end of the member 34 into the hitch receiver, and locks it in place by inserting the locking pin 38. The whole operation takes mere seconds to accomplish. Removal of the carrier requires pulling the pin and then sliding the member out of the receiver.

In one example of a cargo carrier according to the present invention, the cargo box 14 is molded of ABS-type plastic. The tub 15 measures approximately 45 inches long, 22 inches wide and 16 inches high, and the tub walls are about 0.375 inch thick. The lid is sized to fit over the top edge of the tub, and is about 8½ inches high and 0.250 inch thick. The lights 24 are part number V-306-R available from Peterson Manufacturing Co. of Grandview, Mo. 64030. The draw latches 22 are part number 040120-1/4 chrome, available from Excelsior Hardware Co. of Stamford, Conn. 06904-1417. The hinges 20 are Southco model E6-10-501-20.

The bracket assembly 16 is formed of 1015-1020 mild steel. The member 34 is round stock having 0.140 inch wall thickness and an overall length of approximately 32 inches. The rear portion is offset above the first or front portion by about nine inches. The sleeve 36 is 9½ inches long, hollow square stock, 0.180 inch thick and sized to fit into a standard 2" hitch receiver. Accordingly, it has outside dimensions slightly less than 2". The plate 30 is 0.250 inch thick and approximately 14 inches wide by 21 inches long. The dimensions of this example allow storing the bracket assembly inside the tub when the cargo carrier is not in use. The tub mounting holes 32 and bolts 50 are 5/16 inch. Independent test results of the bracket assembly just described, mounted in a standard 200 lb. rated capacity female hitch receiver, showed that it withstood loading to 750 lbs. without visible damage or significant deformation. Elastic deflection at 750 lbs. was less than one inch.

Another embodiment of the invention includes a similar cargo carrier adapted for connection to a standard 1¼ inch receiver. In that embodiment, the member 34 is formed of solid square steel stock. It is otherwise similar to the embodiment described above.

The length and geometry of the member 34 both raise the tub above bumper height and spaces the tub rearwardly apart from the vehicle. The raised position of the tub has several advantages. It facilitates loading and unloading the tub. The elevation also makes the tub and particularly the lights more visible to following traffic for enhanced safety and maximizes ground clearance for off-road use. It minimizes obscuring the vehicle rear license plate. Also, the elevation brings the tub partially into the driver's view through the rear window or side mirror to assist the driver in backing up the vehicle safely.

The spacing of the tub apart from the rear of the vehicle allows mounting the carrier on a vehicle having a rear-mounted spare tire. Also, this positioning provides clearance to step between the cargo carrier and the vehicle for connecting and removing the carrier, even absent a spare tire. Additionally, some vehicles have rear windows which swing outward and therefore could not be opened but for this spacing between the cargo carrier and the vehicle. This spacing also allows use of the trunk of a conventional passenger vehicle without removing the cargo carrier.

Having illustrated and described the principles of my invention in a preferred embodiment thereof, it should be readily apparent to those skilled in the art that the invention can be modified in arrangement and detail without departing from such principles. I claim all modifications coming within the spirit and scope of the accompanying claims.

I claim:

1. A cargo carrier for use in combination with a vehicle having a hollow trailer hitch receiver, comprising:
   container means for holding an article;
   a rigid bracket for supporting the container means in a predetermined position relative to the automobile; the bracket insertion into the hollow hitch receiver and adapted at the second end portion for connection to the container means; consisting of:
   a single, hollow elongate member having first and second end portions;

a hollow sleeve having a square external cross-section sized for fitting engagement into the hitch receiver and defining an aperture sized for receiving the first end portion of the elongate member in fitting engagement into the sleeve, the first end portion being fixed in fitting engagement through the aperture into the sleeve; and a plate fixed to the second end portion for connection to the container means;

the elongate member having a pair of complementary obtuse bends intermediate the first and second end portions such that the first and second end portions are parallel to and offset from each other so that, when the carrier is mounted on the vehicle, the container means is spaced apart from and substantially elevated above the receiver; and retainer means for retaining the sleeve completely engaged into the hitch receiver.

2. A carrier according to claim 1 including means defining access space extending laterally of the elongate member for allowing a user access to the hitch receiver while the carrier is connected to a vehicle.

3. A rigid bracket for supporting a container in a predetermined position outside a vehicle having a hollow hitch receiver mounted on a rear end of the vehicle, consisting of:

a single hollow elongated member having first and second end portions;

a hollow sleeve having a square external cross-section sized for fitting engagement into the hitch receiver and defining an aperture sized for receiving the first end portion of the elongate member in fitting engagement into the sleeve, the first end portion being fixed in fitting engagement through the aperture into the sleeve; and a plate fixedly mounted on the second end portion for connection to the container.

4. A bracket according to claim 3 wherein:

the hollow elongated member consists of the first and second end portions and a straight central portion intermediate the first and second end portions, the first and second end portions meeting the central portion at equal and opposite angles so that the first and second end portions extend parallel to and offset from each other;

the hollow elongated member has an overall length of approximately 32 inches (81 cm.) and the second end portion is offset above the first end portion by approximately nine inches (23 cm.).

5. A method of carrying cargo on the exterior of a vehicle having a trailer hitch receiver, comprising the steps of:

providing a container for containing a predetermined volume of cargo;

mounting the container on a single elongate bracket configured to support the container in a predetermined position relative to the vehicle, the bracket being adapted at a first end portion for insertion into the receiver and adapted at a second end portion for removable connection to the container;

providing access space extending laterally of the elongate bracket between the vehicle and the container for allowing access to the trailer hitch receiver for connecting the bracket to the trailer hitch receiver;

connecting the container to the second end portion of the bracket;

while standing in the access space, inserting the first end portion of the bracket into the receiver;

retaining the bracket in a predetermined position in the receiver; and loading the cargo into the container.

6. A cargo carrier system for use in combination with a motor vehicle having a pair of tail lights spaced apart on the rear end of the vehicle, the cargo carrier system comprising:

a hollow trailer hitch receiver fixed to the rear of the vehicle at a central location;

a waterproof container for holding a predetermined volume of cargo, the container having a length less than the spacing between the pair of tail lights so that, when the container is mounted centrally and rearwardly of the vehicle, the vehicle tail lights are unobstructed;

the container including a rectangular tub and a lid for covering the tub;

the tub having an open top, a bottom wall, a pair of sidewalls and a pair of end walls;

the lid hingedly connected to the tub along one of the end walls such that, when the container is spaced rearwardly apart from the vehicle by a predetermined distance, the lid swings along a path parallel to the rear end of the vehicle;

a single elongate, rigid bracket for connecting the container to the vehicle, the bracket the bracket consisting of:

a single, hollow elongate member having first and second end portions; and a hollow sleeve having a square external cross-section sized for fitting engagement into the hitch receiver and defining an aperture sized for receiving the first end portion of the elongate member in fitting engagement into the sleeve, the first end portion being fixed in fitting engagement through the aperture into the sleeve;

the bracket including a pair of complementary obtuse bends such that the first and second end portions are parallel to and offset from each other so that, when the first end portion of the bracket is engaged in the hitch receiver, the second end portion of the bracket is elevated above the height of the hitch receiver for elevating the container above the hitch receiver;

the bracket being shaped and sized to space the container apart from the hitch receiver by a distance sufficient to allow a person to stand therebetween, thereby providing access space extending laterally of the bracket between the vehicle and the container when the carrier is connected to the vehicle to allow access to the hitch receiver for engaging and disengaging the first end portion of the bracket;

a rigid plate, fixed to the second end portion of the bracket and extending laterally and symmetrically therefrom for supporting the container;

the rigid plate being sized smaller than the bottom wall of the tub and removably connected to a central region of the bottom wall of the tub for supporting the container in a centered position relative to the bracket;

the plate sized to provide lateral stability to the container.

* * * * *

UNITED STATES PATENT AND TRADEMARK OFFICE
CERTIFICATE OF CORRECTION

PATENT NO. : 5,038,983

DATED : August 13, 1991

INVENTOR(S) : Louis H. Tomososki

It is certified that error appears in the above-identified patent and that said Letters Patent is hereby corrected as shown below:

Col. 6, lines 64-66, the phrase "insertion into the hollow hitch receiver and adapted at the second end portion for connection to the container means;" should be deleted.

Signed and Sealed this

Fifth Day of May, 1992

Attest:

DOUGLAS B. COMER

*Attesting Officer*      *Acting Commissioner of Patents and Trademarks*